United States Patent

[11] 3,622,585

[72] Inventor Leslie M. Werbel
Ann Arbor, Mich.
[21] Appl. No. 824,680
[22] Filed May 14, 1969
[45] Patented Nov. 23, 1971
[73] Assignee Parke, Davis & Company
Detroit, Mich.

[54] CERTAIN 5-NITRO-4-THIAZOLIN-3-YLIDENEUREA COMPOUNDS
6 Claims, No Drawings

[52] U.S. Cl..................................... 260/294.8 D,
260/306.8 R, 260/999
[51] Int. Cl....................................... C07d 31/50,
C07d 91/26
[50] Field of Search........................... 260/294.8
D, 306.8 R

[56] References Cited
UNITED STATES PATENTS
2,755,285 7/1956 O'Neill.................. 260/306.8
3,499,910 3/1970 Driscoll.................. 260/306.8

OTHER REFERENCES
Elderfield, Heterocyclic Compounds, Wiley-London, Vol. 5, pp. 571, 572, 592, 593, 1957; QD 400 E4C.2

Primary Examiner—Alan L. Rotman
Attorneys—Robert R. Adams, David B. Ehrlinger, George M. Richards and Edward J. Gall ABSTRACT: 5-Nitro-4-thiazolin-2-ylideneurea compounds having the formula

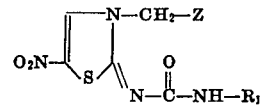

where $R_1$ is alkyl or allyl and Z represents a heterocyclic group, such as thienyl, pyridyl, furyl, thiazolyl, and isoxazolyl, as well as these same groups substituted once or twice with methyl; and their production by reacting a 5-nitro-2-thiazolylurea with an appropriate organic halide in the presence of a base. The compounds are useful as schistosomacides and trichomonacides.

CERTAIN 5-NITRO-4-THIAGOLIN-3-YLIDENEUREA COMPOUNDS

SUMMARY AND DETAILED DESCRIPTION

The present invention relates to new thiazoline compounds that are useful as chemotherapeutic agents and to methods for their production. More particularly, the invention relates to new 5-nitro-4-thiazolin-2-ylideneurea compounds having the formula

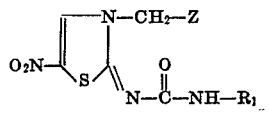

I where $R_1$ is an alkyl group having not more than four carbon atoms or allyl and Z represents a heterocyclic group, such as thienyl, pyridyl, furyl, thiazolyl, and isoxazolyl, as well as these same groups substituted once or twice with methyl. Examples of preferred heterocyclic groups represented by Z are 2-thienyl, 2-, 3-, and 4-pyridyl, 2-furyl, 2-methyl-4-thiazolyl, and 3,5-dimethyl-4-isoxazolyl.

In accordance with the invention, compounds having formula I above are produced by reacting a 5-nitro-2-thiazolylurea compound having the formula

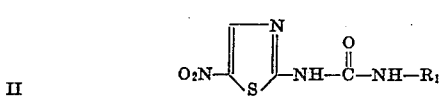

II with an organic halide compound having the formula $$Z-CH_2-X$$

III in the presence of a base; where $R_1$ and Z are as defined earlier and X is bromine, chlorine, or iodine, preferably chlorine. Bases that may be used in the reaction include alkali metal hydrides, alkali metal amides, and alkali metal alkoxides. The preferred base is an alkali metal hydride, especially sodium hydride. The reaction is best carried out in an unreactive solvent medium. With the preferred alkali metal hydride base, any of a number of anhydrous nonhydroxylic solvents may be used, including ethers, such as dioxane and tetrahydrofuran; tertiary amides, such as N,N-dimethylformamide, N,N-dimethylacetamide, and N-methyl-2-pyrrolidinone; dimethyl sulfoxide; and mixtures of these. A preferred solvent is N,N-dimethylformamide. The temperature and duration of the reaction are not critical and may be varied over a wide range, the temperature from 0° to about 150° C. and the duration from about 1 to about 24 hours. In the preferred method for carrying out the reaction, the 5-nitro-2-thiazolylurea compound of formula II is first mixed with the base in the chosen solvent, the halide compound of formula III is added, and the resulting reaction mixture is stirred for a period of about 2 to 4 hours at a temperature in the range of from 60°–100° C. While equimolar quantities of reactants and base may be used, best results are obtained with a slight excess of both the organic halide and the base.

The 5-nitro-2-thiazolylurea starting materials having formula II above are prepared by reacting 2-amino-5-nitrothiazole with an isocyanate compound having the formula $$R_1-N=C=O$$

IV where $R_1$ has the same meaning as previously given.

The compounds of the invention are useful as chemotherapeutic agents, especially as antiparasitic agents that exhibit schistosomacidal and trichomonacidal activity. Their activities can be demonstrated and quantitatively measured in standard tests against *Schistosoma mansoni* and *Trichomonas vaginalis*.

In the test used to determine schistosomacidal activity, female Stout mice weighing 13–15 grams each are infected intraperitoneally with 75 *S. mansoni* (Puerto Rican strain) cercariae (from the snail host *Australorbis glabratus*) 6 weeks prior to treatment. The experimental groups usually consist of five to 10 mice, while the sham-dosed control groups number 10 to 15 mice per experiment. All of the mice are fed Rockland mouse food from the time of infection to autopsy. The test compounds are administered in the diet or by gavage.

Following treatment for a measured period, the animals are killed and autopsied, and the activity of the test compound is evaluated primarily on the basis of the distribution and number of living and dead worms in the liver, portal veins, and mesenteric veins. This activity is then expressed in terms of the percentage of schistosomes found killed after the period of treatment at a given dosage level, which is expressed either as a percentage of the diet or in mg./kg./day when administration is by gavage. The activities of some representative compounds of the present invention, as determined by this test procedure, are shown in the table that follows. The compounds in the table are identified by reference to formula I.

SCHISTOSOMACIDAL ACTIVITY

| Compound | | % Schistosomes Dead at Gavage Dose (mg./kg./day) for Number of Days |
|---|---|---|
| $R_1$ | Z | |
| $C_2H_5$ | 3-pyridyl | 100/400/5 |
| | | 98/100/5 |
| $C_2H_5$ | 4-pyridyl | 100/400/5 |
| | | 59/100/5 |
| $C_2H_5$ | 2-furyl | 100/400/5 |
| $C_2H_5$ | 3,5-dimethyl-4-isoxazolyl | 99/200/5 |
| | | 74/50/5 |

The test used to determine trichomonacidal activity is an in vitro test against *Trichomonas vaginalis*. In this test, Kupferberg's medium, containing 250 γ/ml. of sodium penicillin G and streptomycin sulfate, is inoculated with a sufficient number of organisms from a 24-hour Kupferberg culture to give 10,000 trichomonads/ml. The resulting mixture (4.5 ml.) is then added to 0.5 ml. of a solution or suspension of a measured quantity of the test compound in aqueous ethanol in screw-capped tubes, and the tubes are incubated at 37.0° C. for 48 hours. Varied concentrations of the test compound are obtained by serial dilution. After incubation, the effect of the test compound is determined by microscopic examination of 0.02 ml. of the test preparation dispersed under a 22×22 mm. coverslip. The number of viable trichomonads per Howard disc field is recorded, with at least 10 fields being counted. The test preparations are also compared with control tubes to which no test compound is added. The test compound is rated as follows, according to the percentage of suppression of the number of viable organisms; cidal—100 percent; static—90 to 99.9 percent; suppressive—50 to 89.9 percent; inactive—less than 50 percent. The trichomonacidal activities of some representative compounds of the present invention, as determined by the foregoing test procedure, are shown in the following table, where the compounds are again identified by reference to formula I.

TRICHOMONACIDAL ACTIVITY

| Compound | | |
|---|---|---|
| $R_1$ | Z | Rating (dosage, γ/ml.) |
| $C_2H_5$ | 3-pyridyl | cidal (25) |
| | | static (6.25) |
| | | suppressive (1.56) |
| $C_2H_5$ | 4-pyridyl | cidal (25) |
| | | static (1.56) |
| | | suppressive (0.4) |
| $C_2H_5$ | 2-furyl | cidal (25) |
| | | static (6.25) |
| | | suppressive (1.56) |
| $C_2H_5$ | 3,5-dimethyl-4-isoxazolyl | cidal (25) |
| | | static (6.25) |

The invention is illustrated by the following examples.

EXAMPLE 1

To a stirred mixture of 43.2 g. of 1-ethyl-3-(5-nitro-2-thiazolyly)urea and 200 ml. of N,N-dimethylformamide, cooled to 10°–20° C., is added 8.8 g. of a 55 percent sodium hydride in mineral oil dispersion. The resulting solution is warmed to 75° C., 35.5 g. of 2-chloromethylthiophene is slowly added, and the reaction mixture is stirred and heated at 75°–85 C. for 2.5 hours. Upon cooling, it is diluted with 500 ml. of toluene, and the solution obtained is washed with three 100-ml. portions of water, dried, and evaporated under reduced pressure to give a solid residue of 1-ethyl-3-[5-nitro-3-(2-thenyl)-4-thiazolin-2-ylidene]urea; m.p. 158°–160° C., following successive crystallizations from 2-propanol and acetonitrile.

EXAMPLE 2

To a stirred mixture of 14.0 g. of 1-ethyl-3-(5-nitro-2-thiazolyl)urea and 100 ml. of N,N-dimethylformamide, cooled to 10°–20° C., is added 2.4 g. of a 55 percent sodium hydride in mineral oil dispersion. The resulting solution is warmed to 70° C., 10 g. of 4-chloromethyl-3,5-dimethylisoxazole is added, and the reaction mixture is stirred and heated at 75°–85 C. for 2.5 hours. Upon cooling, it is diluted with 300 ml. of toluene, and the the toluene solution is washed with three 75-ml. portions of water, dried, and evaporated to give a solid residue of 1-{3-[(3,5-dimethyl-4-isoxazolyl)methyl]-5-nitro-4-thiazolin-2-ylidene}-3-ethylurea; m.p. 183°–185° C. following crystallization from 2-propanol.

EXAMPLE 3

Utilizing the general procedure described in examples 1 and 2, the following 5-nitro-4-thiazolin-2-ylideneurea compounds are obtained from the reactants indicated:

a. 1-Ethyl-3-[5-nitro-3-(2-pyridylmethyl)-4-thiazolin-2-ylidene]urea, m.p. 134°–137° C., following successive crystallizations from 2-propanol, acetonitrile-water, and 2-propanol; from 21.6 g. of 1-ethyl-3-(5-nitro-2-thiazolyl)urea, 4.4 g. of a 55 percent sodium hydride in mineral oil dispersion, and 14 g. of 2-chloromethylpyridine.

b. 1-Ethyl-3-[5-nitro-3-(3-pyridylmethyl)-4-thiazolin-2-ylidene]urea, m.p. 172°–175° C., following crystallization from acetonitrile; from 21.6 g. of 1-ethyl-3-(5-nitro-2-thiazolyl)urea, 4.4 g. of a 55 percent sodium hydride in mineral oil dispersion, and 14 g. of 3-chloromethylpyridine.

c. 1-Ethyl-3-[5-nitro-3-(4-pyridylmethyl)-4-thiazolin-2-ylidene]urea, m.p. 223°–227° C. (crystallization from ethanol); from 21.6 g. of 1-ethyl-3-(5-nitro-2-thiazolyl)urea, 4.4 g. of a 55 percent sodium hydride in mineral oil dispersion, and 14 g. of 4-chloromethylpyridine.

d. 1-Ethyl-3-(3-furfuryl-5-nitro-4-thiazolin-2-ylidene)-urea, m.p. 135°–136° C. (2-propanol); from 21.6 g. of 1-ethyl-3-(5-nitro-2-thiazolyl)urea, 4.4 g. of a 55 percent sodium hydride in mineral oil dispersion, and 12.8 g. of furfuryl chloride.

e. 1-Ethyl-3-{3-[(2-methyl-4-thiazolyl)methyl]-5-nitro-4-thiazolin-2-ylidene}urea, m.p. 178°–180° C. (2-propanol); from 10.8 g. of 1-ethyl-3-(5-nitro-2-thiazolyl)urea, 2.2 g. of a 55 percent sodium hydride in mineral oil dispersion, and 8.1 g. of 4-chloromethyl-2-methylthiazole.

f. 1-Methyl-3-[5-nitro-3-(4-pyridylmethyl)-4-thiazolin-2-ylidene]urea, m.p. 237° C. (with decomposition; crystallization from ethanol); from 20.2 g. of 1-methyl-3-(5-nitro-2-thiazolyl)urea, 4.4 g. of a 55 percent sodium hydride in mineral oil dispersion, and 14 g. of 4-chloromethylpyridine.

g. 1-Butyl-3-[5-nitro-3-(3-pyridylmethyl)-4-thiazolin-2-ylidene]urea; from 24.4 g. of 1-butyl-3-(5-nitro-2-thiazolyl)urea, 4.4 g. of a 55 percent sodium hydride in mineral oil dispersion, and 14 g. of a 3-chloromethylpyridine.

h. 1-Allyl-3-[5-nitro-3-(2-pyridylmethyl)-4-thiazolin-2-ylidene]urea, m.p. 121°–124° C. (2-propanol); from 22.8 g. of 1-allyl-3-(-nitro-2-thiazolyl)urea, 4.4 g. of a 55 percent sodium hydride in mineral oil dispersion, and 14 g. of 2-chloromethylpyridine.

The 1-allyl-3-(5-nitro-2-thiazolyl)urea starting material is prepared as follows. A mixture consisting of 14.5 g. of 2-amino-5-nitrothiazole, 8.3 g. of allyl isocyanate, and 150 ml. of N,N-dimethylformamide is stirred and heated at 60°–70°C. for 10 hours, cooled, and poured into ice water, and the 1-allyl-3-(5-nitro-2-thiazolyl)urea that precipitates is isolated by filtration, washed with water, dried, and crystallized from aqueous ethanol; m.p. 176°–180° C.

I claim:

1. A 5-nitro-4-thiazolin-2-ylideneurea compound having the formula

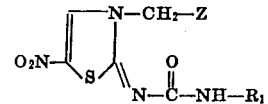

where $R_1$ is a member of the class consisting of an alkyl group having not more than four carbon atoms and allyl and Z is a member of the class consisting of 2-thienyl, 2-pyridyl, 3-pyridyl, 4-pyridyl, 2-furyl, 2-methyl-4-thiazolyl, and 3,5-dimethyl-4-isoxazolyl.

2. A compound according to claim 1 which is 1-ethyl-3-[5-nitro-3-(3-pyridylmethyl)-4-thiazolin-2-ylidene]urea.

3. A compound according to claim 1 which is 1-ethyl-3-[5-nitro-3-(4-pyridylmethyl)-4-thiazolin-2-ylidene]urea.

4. A compound according to claim 1 which is 1-ethyl-3-(3-furfuryl-5-nitro-4-thiazolin-2-ylidene)urea.

5. A compound according to claim 1 which is 1-{3-[(3,5-dimethyl-4-isoxazolyl)methyl]-5-nitro-4-thiazolin-2-ylidene}-3-ethylurea.

6. A compound according to claim 1 which is 1-ethyl-3-[5-nitro-3-(2-thenyl)-4-thiazolin-2-ylidene]urea.

* * * * *